United States Patent
Kondou

(10) Patent No.: US 7,786,208 B2
(45) Date of Patent: Aug. 31, 2010

(54) MODIFIED NATURAL RUBBER MASTERBATCH AND METHOD FOR PRODUCING THE SAME AS WELL AS RUBBER COMPOSITION AND TIRE

(75) Inventor: Hajime Kondou, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/719,738

(22) PCT Filed: Nov. 18, 2005

(86) PCT No.: PCT/JP2005/021280

§ 371 (c)(1),
(2), (4) Date: May 18, 2007

(87) PCT Pub. No.: WO2006/054713

PCT Pub. Date: May 26, 2006

(65) Prior Publication Data

US 2008/0125534 A1    May 29, 2008

(30) Foreign Application Priority Data

Nov. 19, 2004   (JP) ............... 2004-335706
Nov. 19, 2004   (JP) ............... 2004-335735

(51) Int. Cl.
*C08L 7/00*   (2006.01)
*C08K 3/00*   (2006.01)
*B60C 1/00*   (2006.01)

(52) U.S. Cl. ................ 524/575.5; 524/444; 524/458; 525/63; 152/151; 152/565

(58) Field of Classification Search ............ 525/63, 525/105, 475, 350; 524/333, 342, 460, 457–8, 524/575.5, 588, 443–4; 152/151, 565
See application file for complete search history.

(56) References Cited

U.S. PATENT DOCUMENTS

2003/0032724 A1*   2/2003   Noda et al. ............... 525/63
2003/0088006 A1    5/2003   Yanagisawa et al.
2003/0134943 A1    7/2003   Labarre et al.
2007/0010610 A1*   1/2007   Kondo ..................... 524/493

FOREIGN PATENT DOCUMENTS

| EP | 1 283 219 A2 | 2/2003 |
|----|---|---|
| JP | 54-113641 A | 9/1979 |
| JP | 2-43233 A | 2/1990 |
| JP | 5-287121 A | 11/1993 |
| JP | 6-329702 A | 11/1994 |
| JP | 06329702 A * | 11/1994 |
| JP | 9-25468 A | 1/1997 |
| JP | 9-151275 A | 6/1997 |
| JP | 10-231381 A | 9/1998 |
| JP | 2000-26661 A | 1/2000 |
| JP | 2000-109612 A | 4/2000 |
| JP | 2000-319339 A | 11/2000 |
| JP | 2001288228 A * | 10/2001 |
| JP | 2002-138266 A | 5/2002 |
| JP | 2002-348559 A | 12/2002 |
| JP | 2003-520880 A | 7/2003 |
| JP | 2004-99625 A | 4/2004 |

OTHER PUBLICATIONS

Machine Translation of Japanese Documents JP 2001-288228 and JP 06-329702.*
Office Action for Japanese Patent Application No. 2004-335735 dated May 11, 2010.
Japanese Office Action for Japanese Application No. 2004-335706 dated Jun. 8, 2010.

* cited by examiner

*Primary Examiner*—Vasu Jagannathan
*Assistant Examiner*—Hannah Pak
(74) *Attorney, Agent, or Firm*—Sughrue Mion, PLLC

(57) ABSTRACT

This invention provides a method for producing a modified natural rubber masterbatch, which comprises the step of mixing a modified natural rubber latex, which is formed by adding a polar group-containing monomer to a natural rubber latex to graft-polymerize the polar group-containing monomer onto a natural rubber molecule in the natural rubber latex, with a slurry solution formed by previously dispersing a filler into water, and a modified natural rubber masterbatch produced by the method and capable of highly improving a low loss factor, a wear resistance and fracture characteristics of a rubber composition.

14 Claims, 9 Drawing Sheets

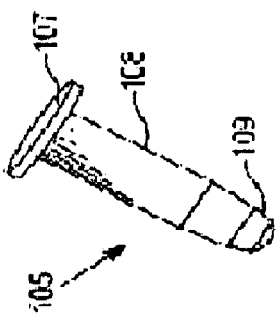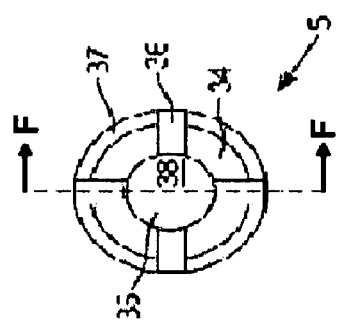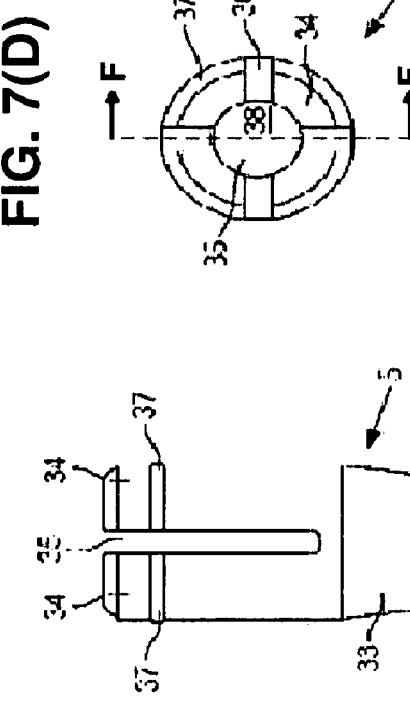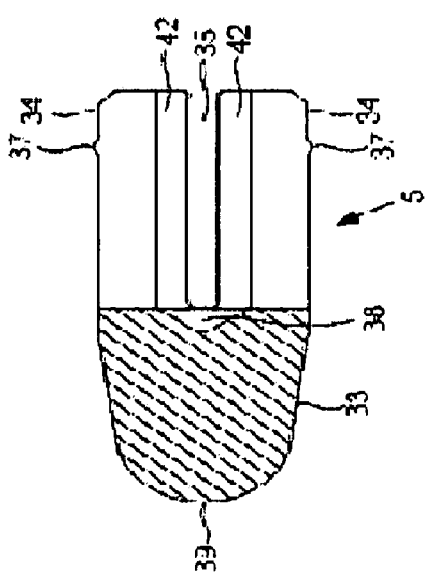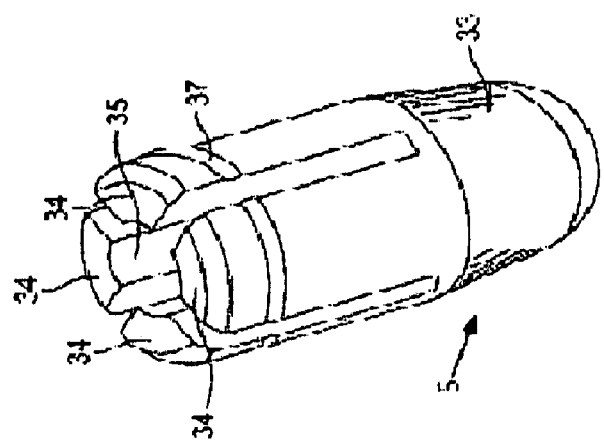

Figure 1:
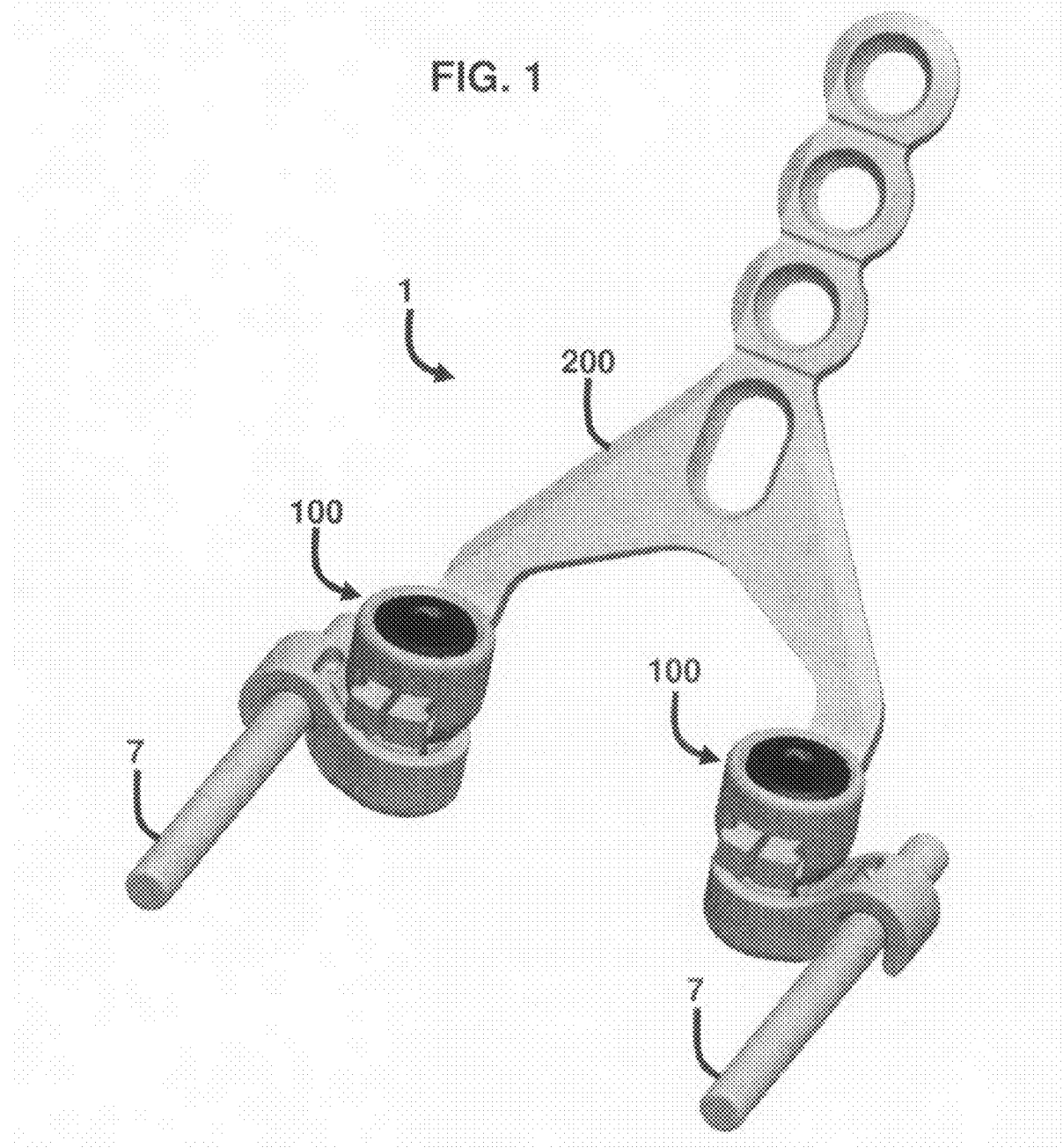
Figure 2:
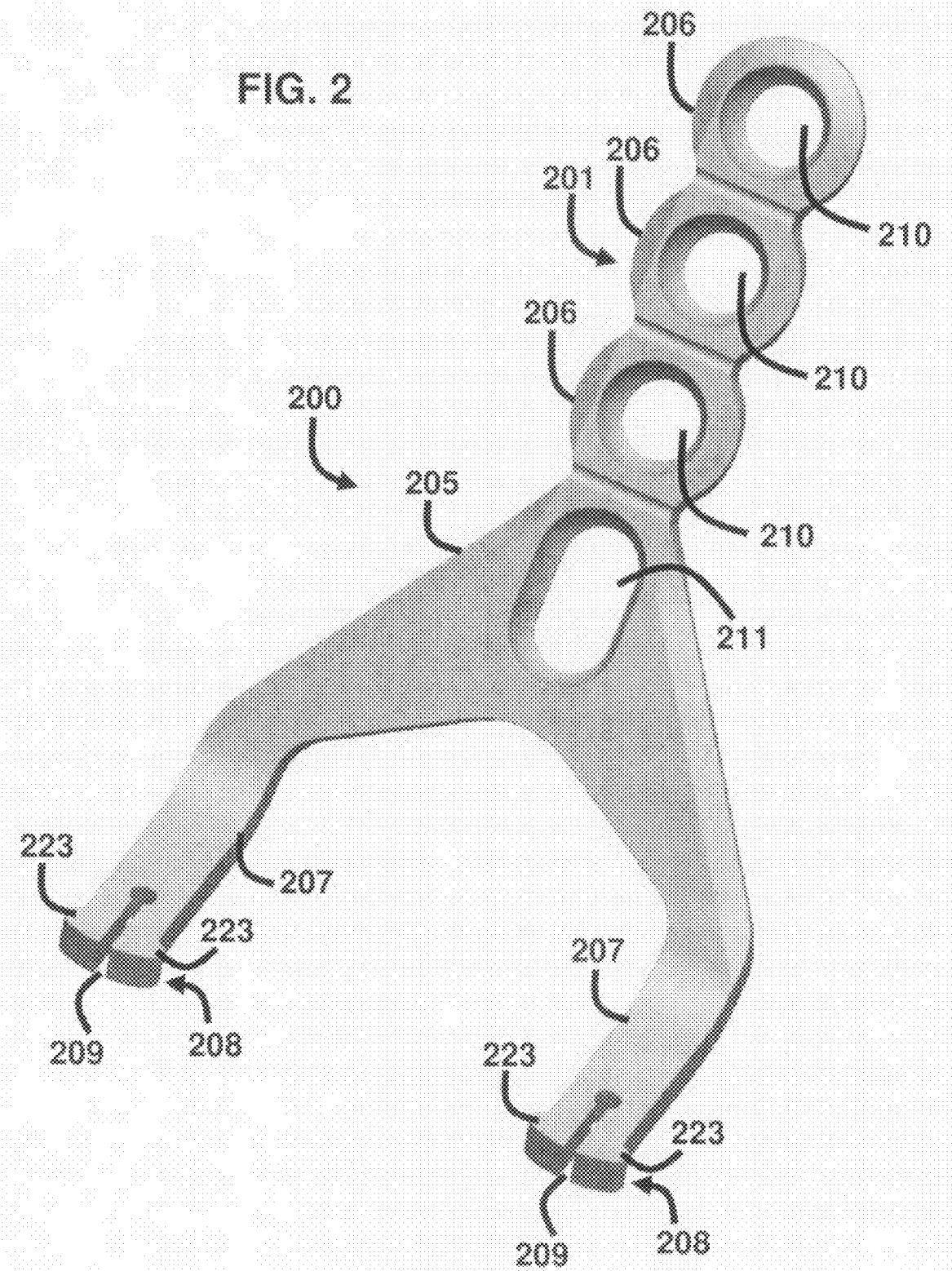
Figure 3:
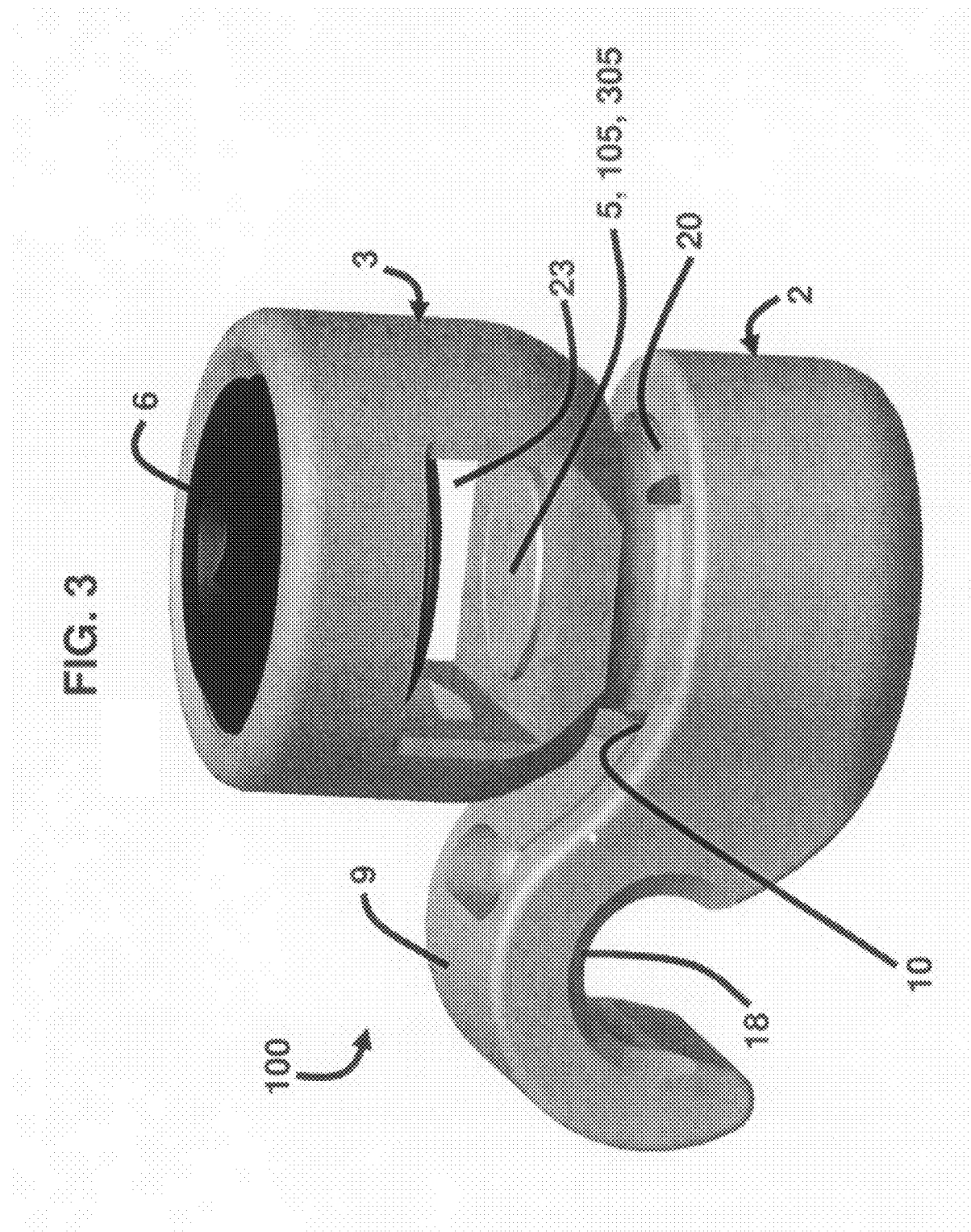
Figure 4:
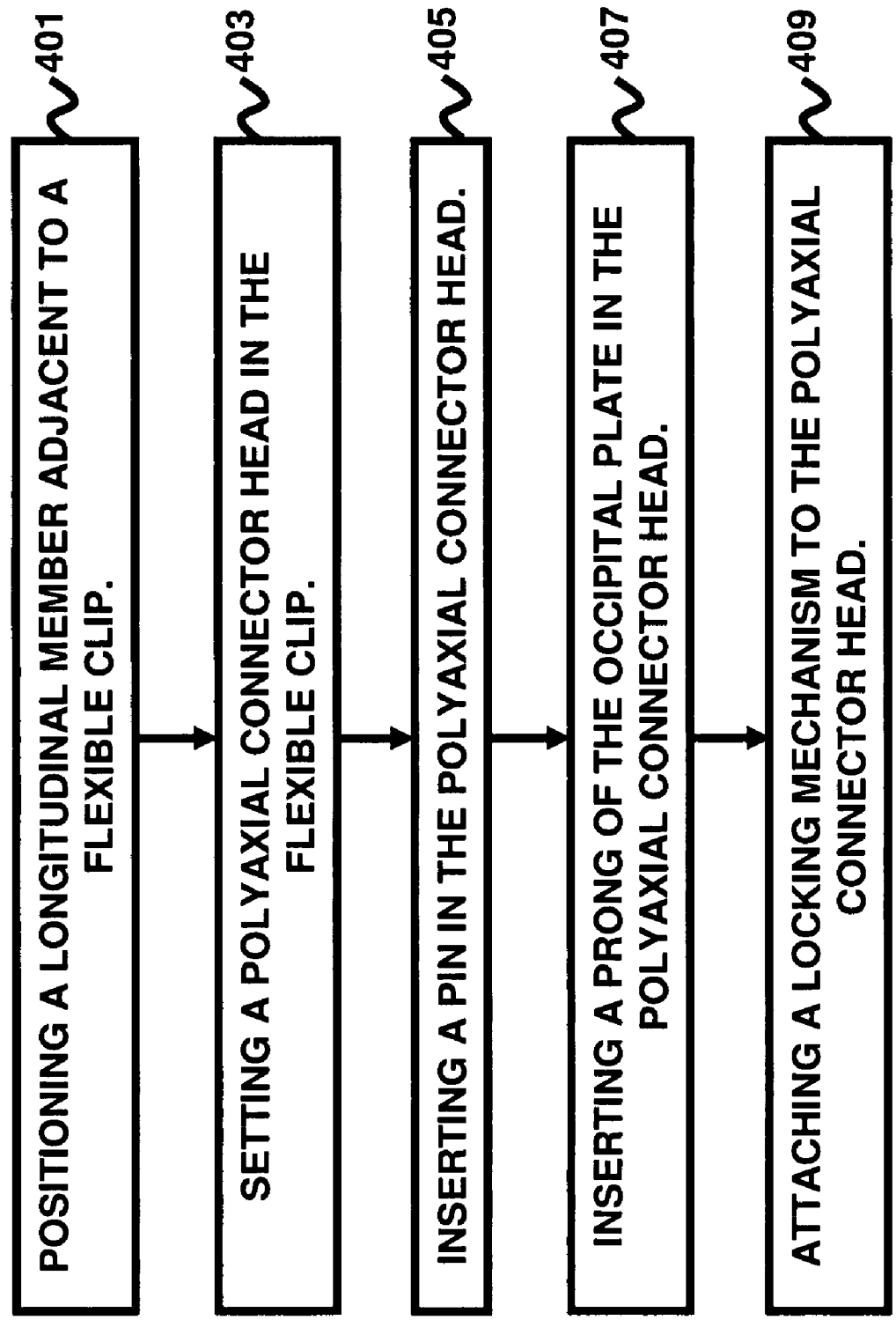
Figure 5A:
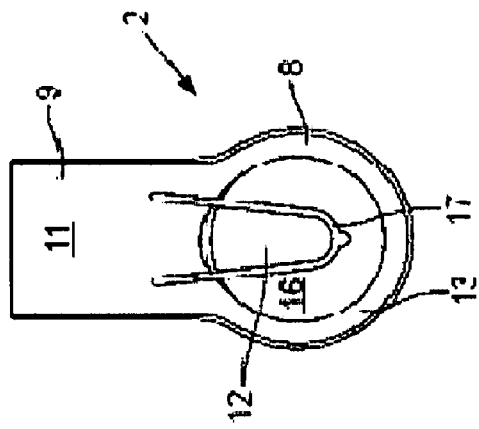
Figure 5B:
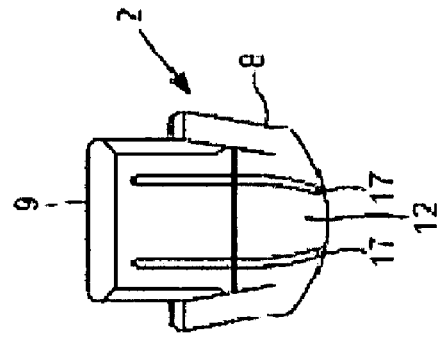
Figure 5C:
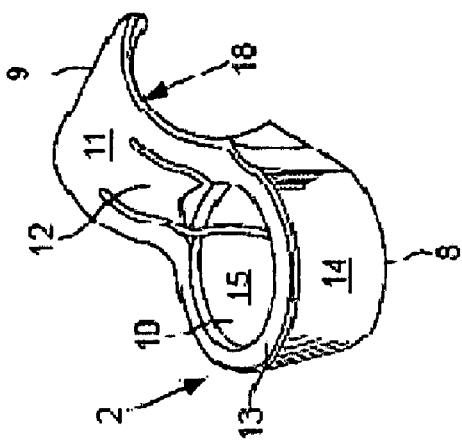
Figure 5D:
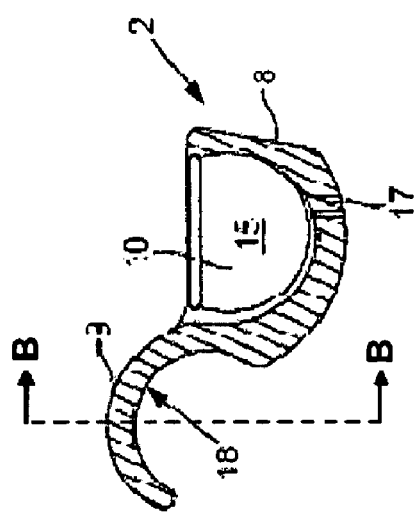
Figure 5E:
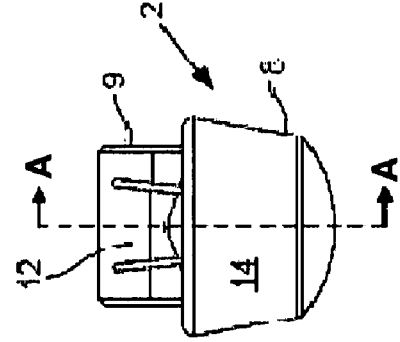
Figure 6B:
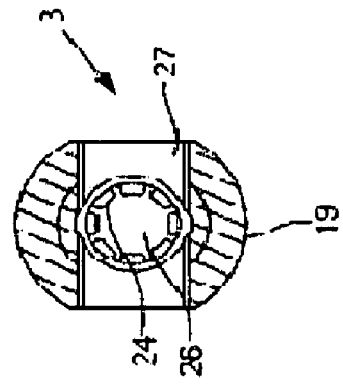
Figure 6A:
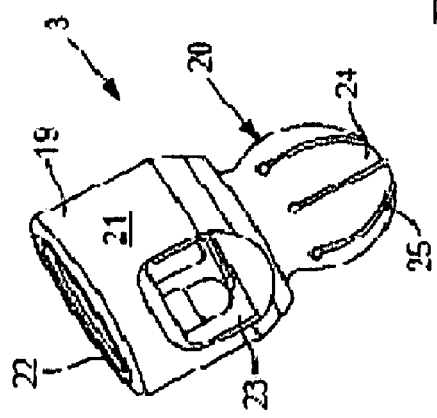
Figure 6E:
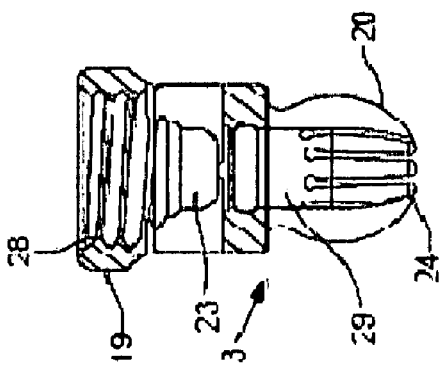
Figure 6D:
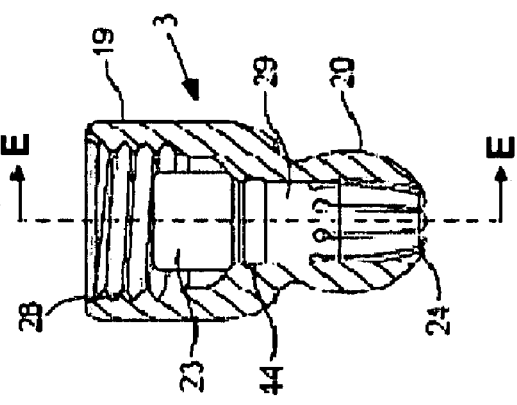
Figure 6C:
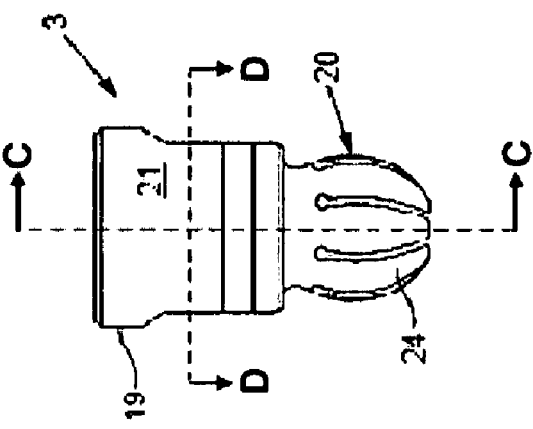

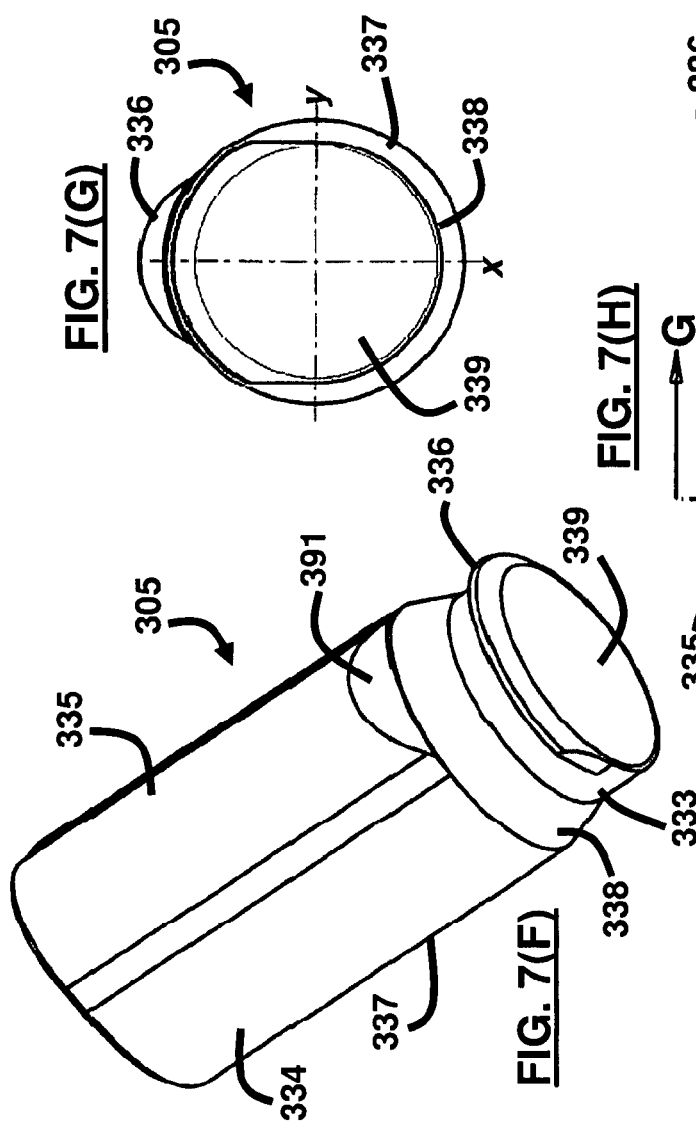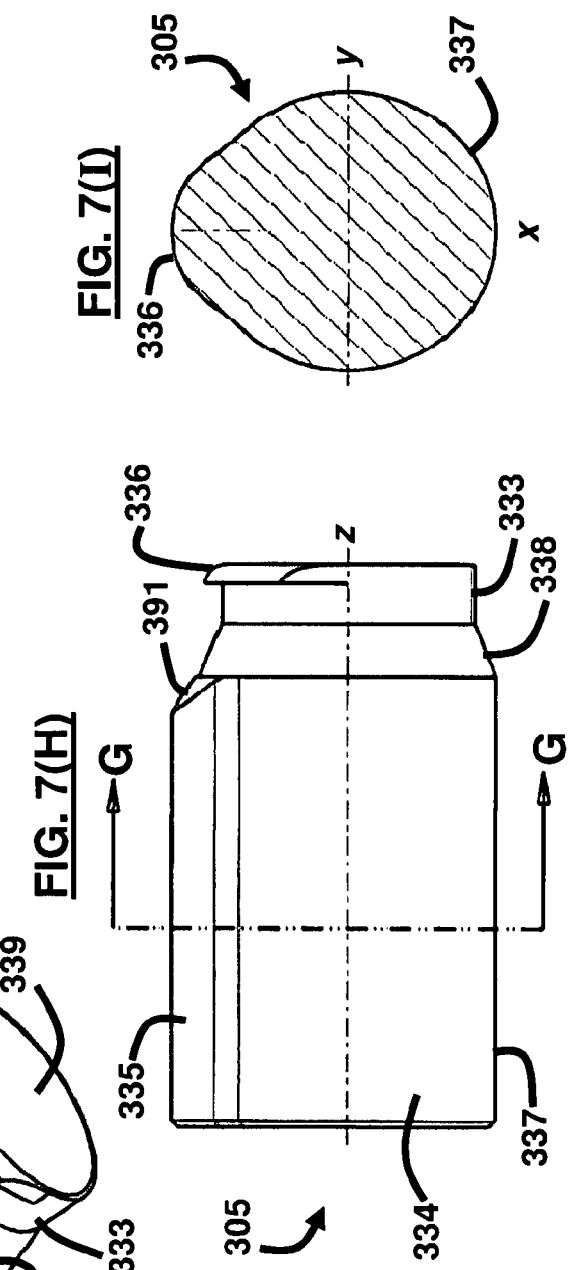
FIG. 7(F)
FIG. 7(G)
FIG. 7(H)
FIG. 7(I)

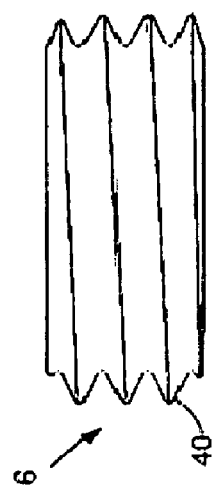
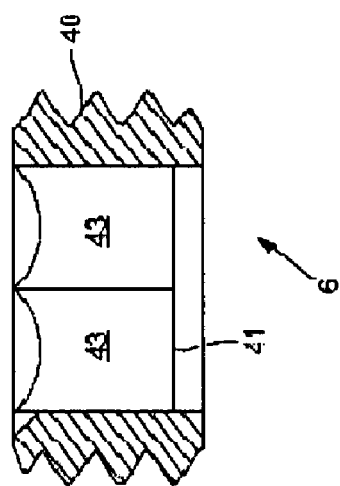
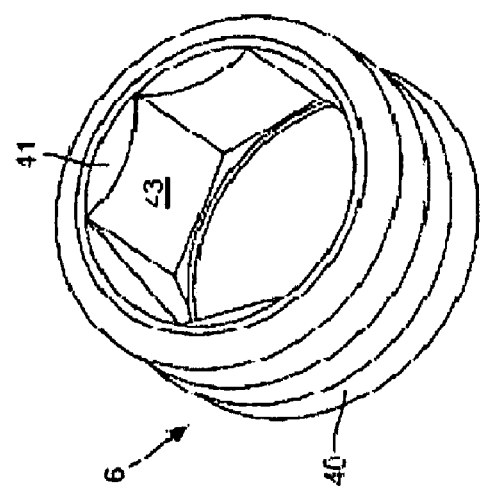
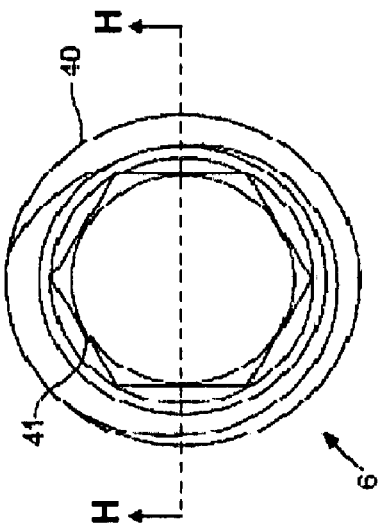
FIG. 8(B)
FIG. 8(D)
FIG. 8(A)
FIG. 8(C)

MODIFIED NATURAL RUBBER MASTERBATCH AND METHOD FOR PRODUCING THE SAME AS WELL AS RUBBER COMPOSITION AND TIRE

TECHNICAL FIELD

This invention relates to a modified natural rubber masterbatch and a method for producing the same as well as a rubber composition and a tire using the modified natural rubber masterbatch, and more particularly to a modified natural rubber masterbatch comprising a modified natural rubber and a filler and capable of highly improving a low loss factor, a wear resistance and a fracture resistance of a rubber composition.

BACKGROUND ART

Lately, it is strongly demanded to reduce a fuel consumption of an automobile and hence a tire having a low rolling resistance is required. For this end, there is required a rubber composition having a low tan δ (hereinafter referred to as a low loss factor) and being excellent in a low heat buildup as a rubber composition used in a tread or the like of the tire. Also, the rubber composition for the tread is required to be excellent in a wear resistance and fracture characteristics in addition to the low loss factor.

In order to improve the low loss factor, wear resistance and fracture characteristics of the rubber composition formed by compounding carbon black into a rubber component, it is effective to improve an affinity between the carbon black and the rubber component in the rubber composition. For example, in order to improve the reinforcing effect with carbon black by improving the affinity between the carbon black and the rubber component in the rubber composition, there are developed a synthetic rubber wherein the affinity for carbon black is improved by a terminal modification, a synthetic rubber wherein the affinity for carbon black is improved by copolymerizing with a functional group-containing monomer and so on.

Also, tan δ of the rubber composition can be lowered to reduce the heat buildup by compounding an inorganic filler such as silica or the like into the rubber component. However, since the inorganic filler is generally low in the affinity for the rubber component, the sufficient reinforcing property cannot be obtained and hence the wear resistance and fracture characteristics of the rubber composition are deteriorated. On the contrary, in order to improve the reinforcing effect with the inorganic filler by improving the affinity between the inorganic filler and the rubber component in the rubber composition, there are developed a synthetic rubber wherein the affinity for the inorganic filler is improved by a terminal modification, a synthetic rubber wherein the affinity for the inorganic filler is improved by copolymerizing with a functional group-containing monomer and so on.

On the other hand, a natural rubber is voluminously used while utilizing its excellent physical characteristics, but there is no technique wherein the affinity for the carbon black or the inorganic filler is improved by modifying the natural rubber itself to highly improve the reinforcing effect with the filler.

For example, there is proposed a technique for epoxidizing the natural rubber. In this technique, however, the affinity between the natural rubber and the filler cannot be sufficiently improved, so that the reinforcing effect with the filler cannot be sufficiently improved. Also, there is known a technique wherein a graft-polymerization is conducted by adding a vinyl-based monomer to a natural rubber latex (see JP-A-H05-287121, JP-A-H06-329702, JP-A-H09-25468, JP-A-2000-319339, JP-A-2002-138266 and JP-A-2002-348559). The grafted natural rubber obtained by this technique is put into a practical use as an adhesive or the like. In the grafted natural rubber, however, a large amount of the vinyl compound as a monomer (20-50% by mass) is grafted for changing the characteristics of the natural rubber itself, so that when it is compounded with a filler, the viscosity is largely increased and the processability is deteriorated. Moreover, since the large amount of the vinyl compound is introduced into the molecular chain of the natural rubber, there are damaged the excellent physical characteristics inherent to natural rubber (viscoelasticity, stress-strain curve in a tensile test and the like).

On the other hand, as a technique for improving a dispersibility of a filler into natural rubber is known a method for producing a natural rubber masterbatch by mixing a natural rubber latex with a slurry solution formed by previously dispersing the filler into water. However, a rubber composition using the natural rubber masterbatch is not sufficient in the reinforcing property, so that there is still a room for improving the wear resistance and fracture characteristics.

DISCLOSURE OF THE INVENTION

It is, therefore, an object of the invention to solve the above-mentioned problems of the conventional techniques and to provide a rubber masterbatch capable of highly improving the low loss factor, the wear resistance and the fracture characteristics of a rubber composition and a method for producing the rubber masterbatch. Also, it is another object of the invention to provide a rubber composition using such a masterbatch and being high in the affinity between a rubber component and a filler and the reinforcing property and excellent in the low loss factor, wear resistance and fracture characteristics as well as a tire using the rubber composition.

The inventor has made various studies in order to achieve the above objects and discovered that the low loss factor, wear resistance and fracture characteristics of the rubber composition can be highly improved by using a modified natural rubber masterbatch obtained through a step of mixing a specified modified natural rubber latex and a slurry solution of a filler, and as a result the invention has been accomplished.

That is, the method for producing the modified natural rubber masterbatch according to the invention is characterized by comprising the step of mixing a modified natural rubber latex, which is formed by adding a polar group-containing monomer to a natural rubber latex to graft-polymerize the polar group-containing monomer onto a natural rubber molecule in the natural rubber latex, with a slurry solution formed by previously dispersing at least one filler selected from the group consisting of carbon black, silica and an inorganic compound represented by the following general formula (I):

$$nM \cdot xSiO_y \cdot zH_2O \qquad (I)$$

[wherein M is at least one selected from the group consisting of a metal of aluminum, magnesium, titanium, calcium or zirconium, oxides and hydroxides of these metals, their hydrates, and carbonates of these metals, n is an integer of 1-5, x is an integer of 0-10, y is an integer of 2-5, and z is an integer of 0-10] into water.

In a preferable embodiment of the method for producing the modified natural rubber masterbatch according to the invention, the filler in the slurry solution has a volume mean particle size (mv) of not more than 25 μm and a 90% volume particle size (D90) of not more than 30 µm, and a 24M4DBP absorption of the filler dried and recovered from the slurry solution is maintained at 93% or more of the 24M4DBP absorption before being dispersed into the water.

In another preferable embodiment of the method for producing the modified natural rubber masterbatch according to the invention, the filler is carbon black, and the polar group of the polar group-containing monomer is at least one selected from the group consisting of amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group and tin-containing group.

In the other preferable embodiment of the method for producing the modified natural rubber masterbatch according to the invention, the filler is at least one selected from the group consisting of silica and the inorganic compound represented by the general formula (I), and the polar group of the polar group-containing monomer is at least one selected from the group consisting of amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group and alkoxysilyl group.

In a still further preferable embodiment of the method for producing the modified natural rubber masterbatch according to the invention, a grafting amount of the polar group-containing monomer is 0.01-5.0% by mass based on a rubber component in the natural rubber latex.

In another preferable embodiment of the method for producing the modified natural rubber masterbatch according to the invention, the modified natural rubber latex and/or the slurry solution further contains a surfactant.

In the method for producing the modified natural rubber masterbatch according to the invention, as the silica are preferable precipitated silica, fumed silica and colloidal silica, while as the inorganic compound represented by the general formula (I) are preferable alumina ($Al_2O_3$), alumina monohydrate ($Al_2O_3.H_2O$), aluminum hydroxide [$Al(OH)_3$], aluminum carbonate [$Al_2(CO_3)_3$], magnesium hydroxide [$Mg(OH)_2$], magnesium oxide (MgO), magnesium carbonate ($MgCO_3$), talc ($3MgO.4SiO_2H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_2$], aluminum magnesium oxide ($MgO.Al_2O_3$), clay ($Al_2O_3.2SiO_2$), kaolin 1($Al_2O_3.2SiO_2.2H_2O$), pyrophyllite ($Al_2O_3.4SiO_2.H_2O$), bentonite ($Al_2O_3.4SiO_2.2H_2O$), aluminum silicate ($Al_2SiO_5$, $Al_4.3SiO_4.5H_2O$), magnesium silicate ($Mg_2SiO_4$, $MgSiO_3$), calcium silicate ($Ca_2SiO_4$), aluminum calcium silicate ($Al_2O_3.CaO.2SiO_2$), magnesium calcium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$] and crystalline aluminosilicate. Moreover, M in the general formula (I) is preferable to be at least one selected from the group consisting of aluminum metal, oxide and hydroxide of aluminum, their hydrates, and carbonate of aluminum.

The method for producing the modified natural rubber masterbatch according to the invention is preferable to further comprise the steps of coagulating the mixture of the modified natural rubber latex and the slurry solution and drying the resulting coagulated mass while applying a mechanical shearing force. At this moment, the drying is preferably performed with a continuous milling machine, and the continuous milling machine is preferably a biaxial milling extruder.

Also, the modified natural rubber masterbatch according to the invention is characterized by producing through the above-described method, and the rubber composition according to the invention is characterized by using the modified natural rubber masterbatch, and the tire according to the invention is characterized by using the rubber composition in any tire member.

According to the invention, there can be provided a modified natural rubber masterbatch having an improved dispersibility of a filler into a modified natural rubber by mixing a specified modified natural rubber latex and a slurry solution of the filler. Moreover, there can be provided a rubber composition having improved low loss factor, wear resistance and fracture characteristics by using the modified natural rubber masterbatch and a tire using the rubber composition.

BEST MODE FOR CARRYING OUT THE INVENTION

The invention will be described in detail below. The method for producing the modified natural rubber masterbatch according to the invention comprises the step of mixing the modified natural rubber latex, which is formed by adding the polar group-containing monomer to the natural rubber latex to graft-polymerize the polar group-containing monomer onto the natural rubber molecule in the natural rubber latex, with the slurry solution formed by previously dispersing at least one filler selected from the group consisting of carbon black, silica and an inorganic compound represented by the general formula (I) into water. Also, the modified natural rubber masterbatch according to the invention is characterized by producing through this method.

In the modified natural rubber masterbatch according to the invention, since the filler is rendered into a masterbatch with a rubber component (i.e., a modified natural rubber in the modified natural rubber latex), the dispersibility of the filler into the rubber component is improved. Also, since the polar group of the polar group-containing monomer is excellent in the affinity for the filler, the modified natural rubber in the modified natural rubber latex is high in the affinity for the filler as compared with the unmodified natural rubber. Furthermore, in the modified natural rubber masterbatch of the invention, the dispersibility of the filler into the rubber component is highly improved by a synergetic effect of the effect of forming the masterbatch from the rubber component and the filler and the effect using the modified natural rubber latex. In the modified natural rubber masterbatch according to the invention, therefore, the reinforcing effect of the filler is sufficiently developed to make significantly excellent the wear resistance and the fracture resistance and highly improve the low heat buildup (low loss factor). Moreover, the wear resistance, fracture resistance and low loss factor of the rubber composition can be highly improved by using the modified natural rubber masterbatch according to the invention, and further the fracture resistance and wear resistance can be significantly improved while highly decreasing the rolling resistance by using the rubber composition in a tire, particularly a tread of the tire.

The natural rubber latex used in the modified natural rubber latex is not particularly limited and can include, for example, a field latex, an ammonia-treated latex, a centrifugally concentrated latex, a deproteinized latex treated with a surfactant or an enzyme, and a combination thereof.

The polar group-containing monomer added to the natural rubber latex has at least one polar group in its molecule and is not particularly limited as long as it can be graft-polymerized with the natural rubber molecule. The polar group-containing monomer is preferable to have a carbon-carbon double bond in its molecule for the graft-polymerization with the natural rubber molecule and is preferably a polar group-containing vinyl-based monomer. As a concrete example of the polar group are preferably mentioned amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group, tin-containing group, alkoxysilyl group and so on. Moreover, when the filler is carbon black, the polar group is preferable to be amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group and tin-containing group. Also, when the filler is silica or the inorganic compound represented by the general formula (I), the polar group is preferable to be amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group and alkoxysilyl group. These polar group-containing monomers may be used alone or in a combination of two or more.

As the amino group-containing monomer are mentioned polymerizable monomers containing in their molecule at least one amino group selected from primary, secondary and tertiary amino groups. Among the polymerizable monomers having the amino group, a tertiary amino group-containing monomer such as dialkylaminoalkyl (metha)acrylate or the like is particularly preferable. These amino group-containing monomers may be used alone or in a combination of two or more.

As the primary amino group-containing monomer are mentioned acrylamide, methacrylamide, 4-vinylaniline, aminomethyl (metha)acrylate, aminoethyl(metha)acrylate, aminopropyl (metha)acrylate, aminobutyl(metha)acrylate and so on.

As the secondary amino group-containing monomer are mentioned (1) anilinostyrenes such as anilinostyrene, β-phenyl-p-anilinostyrene, β-cyano-p-anilinostyrene, β-cyano-β-methyl-p-anilinostyrene, β-chloro-p-anilinostyrene, β-carboxy-p-anilinostyrene, β-methoxycarbonyl-p-anilinostyrene, β-(2-hydroxyethoxy)carbonyl-p-anilino styrene, β-formyl-p-anilinostyrene, β-formyl-β-methyl-p-anilinostyrene, α-carboxy-β-carboxy-β-phenyl-p-anilinostyrene and the like, (2) anilinophenyl butadienes such as 1-anilinophenyl-1,3-butadiene, 1-anilinophenyl-3-methyl-1,3-butadiene, 1-anilinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene, 2-anilinophenyl-3-chloro-1,3-butadiene and the like, and (3) N-monosubstituted (metha)acrylamides such as N-methyl (metha)acrylamide, N-ethyl(metha)acrylamide, N-methylol acrylamide, N-(4-anilinophenyl)methacrylamide and the like.

As the tertiary amino group-containing monomer are mentioned N,N-disubstituted aminoalkyl(metha)acrylate, N,N-disubstituted aminoalkyl(metha)acrylamide and so on.

As the N,N-disubstituted aminoalkyl(metha)acrylate are mentioned esters of acrylic acid or methacrylic acid such as N,N-dimethylaminomethyl(metha)acrylate, N,N-dimethylaminoethyl (metha)acrylate, N,N-dimethylaminopropyl (metha)acrylate, N,N-dimethylaminobutyl(metha)acrylate, N,N-diethylaminoethyl (metha)acrylate, N,N-diethylaminopropyl(metha)acrylate, N,N-diethylaminobutyl(metha)acrylate, N-methyl-N-ethylaminoethyl (metha)acrylate, N,N-dipropylaminoethyl(metha)acrylate, N,N-dibutylaminoethyl (metha)acrylate, N,N-dibutylaminopropyl (metha)acrylate, N,N-dibutylaminobutyl(metha)acrylate, N,N-dihexylamino ethyl(metha)acrylate, N,N-diocytylamino ethyl (metha)acrylate, acryloyl morpholine and so on. Among them, N,N-dimethylaminoethyl(metha)acrylate, N,N-diethylaminoethyl (metha)acrylate, N,N-dipropylaminoethyl(metha)acrylate, N,N-diocytylamino ethyl(metha)acrylate, N-methyl-N-ethylaminoethyl(metha)acrylate and the like are particularly preferable.

Also, as the N,N-disubstituted aminoalkyl (metha)acrylamide are mentioned acrylamide compounds and methacrylamide compound such as N,N-dimethylaminomethyl (metha) acrylamide, N,N-dimethylaminoethyl(metha)acrylamide, N,N-dimethylaminopropyl(metha)acrylamide, N,N-dimethylaminobutyl(metha)acrylamide, N,N-diethylaminoethyl (metha)acrylamide, N,N-diethylaminopropyl(metha)acrylamide, N,N-diethylaminobutyl(metha)acrylamide, N-methyl-N-ethylaminoethyl(metha)acrylamide, N,N-dipropylaminoethyl(metha)acrylamide, N,N-dibutylaminoethyl (metha) acrylamide, N,N-dibutylaminopropyl(metha)acrylamide, N,N-dibutylaminobutyl(metha)acrylamide, N,N-dihexylaminoethyl (metha)acrylamide, N,N-dihexylaminopropyl (metha)acrylamide, N,N-dioctylaminopropyl(metha)acrylamide and so on. Among them, N,N-dimethylaminopropyl (metha)acrylamide, N,N-diethylaminopropyl(metha) acrylamide, N,N-dioctylaminopropyl (metha)acrylamide and the like are particularly preferable.

As the nitrile group-containing monomer are mentioned (metha)acrylonitrile, vinylidene cyanide and so on. These nitrile group-containing monomers may be used alone or in a combination of two or more.

As the hydroxyl group-containing monomer are mentioned polymerizable monomers having in one molecule at least one hydroxyl group selected from primary, secondary and tertiary hydroxyl groups. As such a monomer are mentioned hydroxyl group-containing unsaturated carboxylic acid-based monomers, hydroxyl group-containing vinyl ether-based monomers, hydroxyl group-containing vinyl ketone-based monomers and the like. As the hydroxyl group-containing monomer are concretely mentioned hydroxyalkyl(metha) acrylates such as 2-hydroxyethyl(metha)acrylate, 2-hydroxypropyl(metha)acrylate, 3-hydroxypropyl(metha)acrylate, 2-hydroxybutyl(metha)acrylate, 3-hydroxybutyl(metha) acrylate, 4-hydroxybutyl(metha)acrylate and the like; mono (metha)acrylates of polyalkylene glycol (the number of alkylene glycol units is, for example, 2-23) such as polyethylene glycol, polypropylene glycol and the like; hydroxyl group-containing unsaturated amides such as N-hydroxymethyl (metha)acrylamide, N-(2-hydroxyethyl) (metha)acrylamide, N,N-bis(2-hydroxymethyl) (metha)acrylamide and the like; hydroxyl group-containing vinylaromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like. Among them, the hydroxyl group-containing unsaturated carboxylic acid-based monomers, hydroxyalkyl(metha) acrylates and hydroxyl group-containing vinylaromatic compounds are preferable, and the hydroxyl group-containing unsaturated carboxylic acid-based monomers are particularly preferable. As the hydroxyl group-containing unsaturated carboxylic-based acid monomer are mentioned derivatives such as esters, amides, anhydrides and the like of acrylic acid, methacrylic acid, itaconic acid, fumaric acid, maleic acid and the like. Among them, esters of acrylic acid, methacrylic acid and the like are particularly preferable. These hydroxyl group-containing monomers may be used alone or in a combination of two or more.

As the carboxyl group-containing monomer are mentioned unsaturated carboxylic acids such as (metha)acrylic acid, maleic acid, fumaric acid, itaconic acid, tetraconic acid, cinnamic acid and the like; free carboxyl group-containing esters such as monoesters of a non-polymerizable polyvalent carboxylic acid such as phthalic acid, succinic acid, adipic acid or the like and a hydroxyl group-containing unsaturated compound such as (metha)allyl alcohol, 2-hydroxyethyl (metha) acrylate or the like, and salts thereof. Among them, the unsaturated carboxylic acids are particularly preferable. These carboxyl group-containing monomers may be used alone or in a combination of two or more.

As the epoxy group-containing monomer are mentioned (metha)allyl glycidyl ether, glycidyl(metha)acrylate, 3,4-oxycyclohexyl(metha)acrylate and so on. These epoxy group-containing monomers may be used alone or in a combination of two or more.

As the nitrogen-containing heterocyclic ring in the monomer containing the nitrogen-containing heterocyclic group are mentioned pyrrole, histidine, imidazole, triazolidine, triazole, triazine, pyridine, pyrimidine, pyrazine, indole, quinoline, purine, phenazine, pteridine, melamine and so on. Moreover, the nitrogen-containing heterocyclic ring may include another heteroatom in its ring. A monomer containing pyridyl group as the nitrogen-containing heterocyclic group includes pyridyl group-containing vinyl compounds such as 2-vinylpyridine, 3-vinylpyridine, 4-vinylpyridine, 5-methyl-2-vinylpyridine, 5-ethyl-2-vinylpyridine and so on. Among them, 2-vinylpyridine, 4-vinylpyridine and the like are particularly preferable. These nitrogen-containing heterocyclic group-containing monomers may be used alone or in a combination of two or more.

As the monomer having the tin-containing group are mentioned tin-containing monomers such as allyl tri-n-butyl tin, allyl trimethyl tin, allyl triphenyl tin, allyl tri-n-octyl tin, (metha)acryloxy-n-butyl tin, (metha)acryloxy trimethyl tin, (metha)acryloxy triphenyl tin, (metha)acryloxy-n-octyl tin, vinyl tri-n-butyl tin, vinyl trimethyl tin, vinyl triphenyl tin, vinyl tri-n-octyl tin and so on. These tin-containing monomers may be used alone or in a combination of two or more.

As the alkoxysilyl group-containing monomer are mentioned (metha)acryloxymethyl trimethoxysilane, (metha)acryloxymethyl methyl dimethoxysilane, (metha)acryloxymethyl dimethyl methoxysilane, (metha) acryloxymethyl triethoxysilane, (metha)acryloxymethyl methyl diethoxysilane, (metha)acryloxymethyl dimethyl ethoxysilane, (metha)acryloxymethyl tripropoxysilane, (metha)acryloxymethyl methyl dipropoxysilane, (metha) acryloxymethyl dimethyl propoxysilane, γ-(metha)acryloxypropyl trimethoxysilane, γ-(metha)acryloxypropyl methyl dimethoxysilane, γ-(metha)acryloxypropyl dimethyl methoxysilane, γ-(metha)acryloxypropyl triethoxysilane, γ-(metha)acryloxypropyl methyl diethoxysilane, γ-(metha) acryloxypropyl dimethyl ethoxysilane, γ-(metha)acryloxypropyl tripropoxysilane, γ-(metha)acryloxypropyl methyl dipropoxysilane, γ-(metha)acryloxypropyl dimethyl propoxysilane, γ-(metha)acryloxypropyl methyl diphenoxysilane, γ-(metha)acryloxypropyl dimethyl phenoxysilane, γ-(metha)acryloxypropyl methyl dibenzyloxysilane, γ-(metha)acryloxypropyl dimethyl benzyloxysilane, trimethoxy vinylsilane, triethoxy vinylsilane, 6-trimethoxysilyl-1,2-hexene, p-trimethoxysilyl styrene and so on. These alkoxysilyl group-containing monomers may be used alone or in a combination of two or more.

In the invention, the graft polymerization of the polar group-containing monomer onto the natural rubber molecule is conducted as an emulsion polymerization. In the emulsion polymerization, it is commonly preferable that a solution formed by adding water and if necessary an emulsifying agent to the natural rubber latex is added with the polar group-containing monomer and further added with a polymerization initiator, and stirred at a given temperature to polymerize the polar group-containing monomer. In the addition of the polar group-containing monomer to the natural rubber latex, the emulsifying agent may be previously added to the natural rubber latex, or the polar group-containing monomer may be emulsified with the emulsifying agent and then added to the natural rubber latex. The emulsifying agent usable in the emulsification of the natural rubber latex and/or the polar group-containing monomer is not particularly limited and includes nonionic surfactants such as polyoxyethylene lauryl ether and the like.

The polymerization initiator is not particularly limited and may include various polymerization initiators for the emulsion polymerization, and also the addition method thereof is not particularly limited. As the commonly used polymerization initiator are mentioned benzoyl peroxide, hydrogen peroxide, cummene hydroperoxide, tert-butyl hydroperoxide, di-tert-butyl peroxide, 2,2-azobisisobutyronitrile, 2,2-azobis (2-diaminopropane) hydrochloride, 2,2-azobis(2-diaminopropane) dihydrochloride, 2,2-azobis(2,4-dimethyl-valeronitrile), potassium persulfate, sodium persulfate, ammonium persulfate and so on. Moreover, it is preferable to use a redox type polymerization initiator for lowering the polymerization temperature. As a reducing agent to be combined with a peroxide in the redox type polymerization initiator are mentioned, for example, tetraethylene pentamine, mercaptans, acidic sodium sulfite, a reducing metal ion, ascorbic acid and so on. As a preferable combination of the peroxide and the reducing agent in the redox type polymerization initiator are mentioned a combination of tert-butyl hydroperoxide and tetraethylene pentamine and so on.

In order to improve the low loss factor and the wear resistance of the rubber composition by using the modified natural rubber masterbatch according to the invention without deteriorating the processability, it is important to evenly introduce a small amount of the polar group-containing monomer into each of the natural rubber molecules. Therefore, the amount of the polymerization initiator added is preferably within a range of 1-100 mol %, and more preferably 10-100 mol % based on the polar group-containing monomer.

The aforementioned components are charged into a reaction vessel and reacted at 30 to 80° C. for 10 minutes to 7 hours to obtain the modified natural rubber latex wherein the polar group-containing monomer is graft-copolymerized onto the natural rubber molecule.

In the modified natural rubber latex, the grafting amount of the polar group-containing monomer is preferably within a range of 0.01-5.0% by mass, more preferably 0.02-3.0% by mass, and most preferably 0.03-2.0% by mass based on the rubber component in the natural rubber latex. When the grafting amount of the polar group-containing monomer is less than 0.01% by mass, the low loss factor and the wear resistance of the rubber composition may not be sufficiently improved. While, when the grafting amount of the polar group-containing monomer exceeds 5.0% by mass, the physical properties inherent to the natural rubber such as viscoelasticity, S-S characteristic (stress-strain curve in the tensile testing machine) and so on are largely changed to diminish the excellent physical properties inherent to the natural rubber and also the processability of the rubber composition may be largely deteriorated.

The slurry solution used in the modified natural rubber masterbatch according to the invention is formed by previously dispersing a filler into water. The production of the slurry solution can be carried out by a well-known method, and can use, for example, a mixing machine such as a high-shear mixer of rotor-stator type, a high-pressure homogenizer, an ultrasonic homogenizer, a colloid mill or the like. The slurry solution can be prepared, for example, by charging water into the colloid mill, slowly adding the filler dropwise with stirring and then circulating with a surfactant at a constant pressure and a constant temperature in the homogenizer. In this case, the pressure is commonly within a range of 10-1000 kPa, preferably 200-800 kPa. Also, a continuous slurry flow having a homogeneous composition can be produced by mixing a filler and water at a constant ratio and introducing a mixture thereof into one end of an elongate conduit under a vigorous stirring with a water power. Moreover, the concentration of the filler in the slurry solution is preferably within a range of 0.5-60% by mass, and more preferably 1-30% by mass.

As to the slurry solution, the filler in the slurry solution preferably has a volume mean particle size (mv) of not more than 25 μm and a 90% volume particle size (D90) of not more than 30 μm, and more preferably has a volume mean particle size (mv) of not more than 20 μm and a 90% volume particle size (D90) of not more than 25 μm, and also a 24M4DBP absorption of the filler dried and recovered from the slurry solution is preferably maintained at 93% or more, and more preferably 96% or more of the 24M4DBP absorption before being dispersed into the water. The 24M4DBP absorption is a value measured according to ISO 6894, while the volume mean particle size and the 90% volume particle size are values measured by using a laser diffraction type particle size distribution analyzer and assuming that a refractive index of water is 1.33 and a refractive index of a filler is 1.57. When the particle size (the volume mean particle size and 90% volume particle size) of the filler in the slurry solution is too large, the dispersibility of the filler in the mixture of the modified natural rubber latex and the slurry solution is deteriorated and the reinforcing property and the wear resistance may be deteriorated. While, when an excessive shearing force is applied to the slurry solution for making the particle size small, the structure of the filler is broken to cause the deterioration of the reinforcing property, so that the 24M4DBP absorption of the filler dried and recovered from the slurry solution is preferable to be maintained at 93% or more of the 24M4DBP absorption before being dispersed into the water.

The modified natural rubber latex and/or the slurry solution is preferable to further contain a surfactant in view of improving the stability of the modified natural rubber latex. As the surfactant are mentioned anionic, cationic, nonionic, and amphoteric surfactants. Among them, the anionic and nonionic surfactants are preferable. The amount of the surfactant added is commonly within a range of 0.01-2% by mass, and preferably 0.02-1% by mass based on the modified natural rubber latex.

The carbon black is not particularly limited and includes, for example, GPF, FEF, HAF, ISAF and SAF grade carbon blacks. These carbon blacks may be used alone or in a combination of two or more.

The inorganic filler used in the invention is at least one selected from the group consisting of silica and the inorganic compounds represented by the general formula (I), and M in the general formula (I) is preferable to be at least one selected from the group consisting of aluminum metal, oxide and hydroxide of aluminum, their hydrates, and carbonate of aluminum. As the silica are preferably mentioned precipitated silica, fumed silica, colloidal silica and so on. On the other hand, as the inorganic compound of the formula (I) are mentioned alumina ($Al_2O_3$) such as γ-alumina, α-alumina or the like; alumina monohydrate ($Al_2O_3.H_2O$) such as boehmite, diaspore or the like; aluminum hydroxide [$Al(OH)_3$] such as gibbsite, bayerite or the like; aluminum carbonate [$Al_2(CO_3)_3$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_2$], aluminum magnesium oxide (MgO $Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicate ($Al_2SiO_5$, $Al_4.3SiO_4.5H_2O$, and so on), magnesium silicate ($Mg_2SiO_4$, $MgSiO_3$, and so on), calcium silicate ($Ca_2SiO_4$, and so on), aluminum calcium silicate ($Al_2O_3.CaO.2SiO_2$, and so on), magnesium calcium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$], and crystalline aluminosilicates containing charge-compensating hydrogen, alkali metal or alkaline earth metal such as various zeolites. These inorganic fillers may be used alone or in a combination of two or more.

As the method of mixing the modified natural rubber latex and the slurry solution are mentioned, for example, a method wherein the slurry solution is charged into a blender mill and added dropwise with the modified natural rubber latex with stirring and a method wherein the modified natural rubber latex is added dropwise with the slurry solution with stirring inversely. Also, a method wherein a stream of the modified natural rubber latex and a stream of the slurry are mixed at a constant flow ratio under a vigorous stirring with a water power may also be employed. In this case, the modified natural rubber in the modified natural rubber latex and the filler in the slurry solution are compounded so that the amount of the filler in the slurry solution is preferably 5-100 parts by mass, more preferably 10-70 parts by mass based on 100 parts by mass of the rubber component (i.e., the modified natural rubber) in the modified natural rubber latex. When the amount of the filler compounded is less than 5 parts by mass, the sufficient reinforcing property may not be obtained, while when it exceeds 100 parts by mass, the processability may be deteriorated.

The modified natural rubber masterbatch is commonly formed by mixing the modified natural rubber latex with the slurry solution, and then coagulating and further drying them. The coagulation of the mixture of the modified natural rubber latex and the slurry solution is commonly carried out by using an acid such as formic acid, sulfuric acid or the like, or a salt such as sodium chloride or the like as a coagulating agent. However, the coagulation may be caused by mixing the natural rubber solution with the slurry solution without adding the coagulating agent, and in this case it is not necessary to add the coagulating agent.

In the drying of the mixture after the coagulation can be used a usual dryer such as a vacuum dryer, an air dryer, a drum dryer, a band dryer or the like, but it is preferable to conduct the drying while applying a mechanical shearing force in view of further improving the dispersibility and homogeneity of the filler. By drying while applying the mechanical shear force can be obtained a modified natural rubber masterbatch having excellent processability, reinforcing property and low loss factor. The drying while applying the mechanical shear force can be carried out by a usual milling machine, but it is preferable to use a screw-type continuous milling machine from a viewpoint of the industrial productivity, and it is more preferable to use a corotating or counterrotating biaxial milling extruder. As the screw-type continuous milling machine can be used commercially available products, for example, a biaxial milling extruder made by Kobe Steel, Ltd. and so on. Moreover, a moisture content in the modified natural masterbatch before drying is preferably not less than 10%. When the moisture content in the masterbatch before drying is less than 10%, an improvement in the dispersibility of the filler may be small in the drying step.

To the modified natural rubber masterbatch may be added additives such as a vulcanizing agent, an antioxidant, a colorant, a dispersant and the like in addition to the modified natural rubber latex, the slurry solution and the surfactant.

The rubber composition according to the invention is characterized by using the modified natural rubber masterbatch. Since the modified natural rubber masterbatch is excellent in the homogeneity as mentioned above, the rubber composition according to the invention is excellent in the homogeneity, the loss factor, the wear resistance and the fracture characteristics. Moreover, to the rubber composition of the invention can be added additives usually used in the rubber industry such as a vulcanizing agent, a vulcanization accelerator, an antioxidant, a scorch retarder, zinc white, stearic acid, a silane coupling agent and the like within a scope of not damaging the object of the invention in addition to the modified natural rubber masterbatch. As these additives can be preferably used commercially available ones. The rubber composition of the invention can be produced by compounding the modified natural rubber masterbatch with the various additives properly selected if necessary and milling, warming, extruding and so on.

Further, the tire according to the invention is characterized by using the rubber composition in any tire member. In the tire according to the invention, the rubber composition is preferably used in a tread rubber, and the tire using the rubber composition in the tread is high in the fracture resistance and the wear resistance, low in the rolling resistance and excellent in the low fuel consumption. Moreover, as a gas filled into the tire according to the invention can be used usual air or air having a regulated partial oxygen pressure but also inert gases such as nitrogen, argon, helium and so on.

EXAMPLES

The following examples are given in illustration of the invention and are not intended as limitations thereof.

Production Example of Modified Natural Rubber Masterbatch

Production Example 1 of Modified Natural Rubber Latex

A field latex is subjected to a centrifugal separation with a latex separator [made by Saito Enshin Kogyo Co., Ltd.] at a revolution speed of 7500 rpm to obtain a concentrated latex having a dry rubber concentration of 60%. 1000 g of the concentrated latex is charged into a stainless reaction vessel provided with a stirrer and a temperature-regulating jacket, and an emulsion previously formed by adding 10 mL of water and 90 mg of an emulsifying agent [Emulgen 1108, made by Kao Corporation] to 3.0 g of N,N-diethylaminoethyl methacrylate is added together with 990 mL of water, and then stirred for 30 minutes at room temperature while substituting with nitrogen. Then, 1.2 g of tert-butyl hydroperoxide and 1.2 g of tetraethylene pentamine are added as a polymerization initiator to conduct reaction at 40° C. for 30 minutes, whereby a modified natural rubber latex A is obtained.

The modified natural rubber latex A prepared as described above is coagulated by adding formic acid to adjust pH to 4.7. The thus obtained solid is treated with a clapper 5 times, crumbed through a shredder and dried by a hot air drier at 110° C. for 210 minutes to obtain a modified natural rubber a. It is confirmed from a mass of the thus obtained modified natural rubber a that the conversion of N,N-diethylaminoethyl methacrylate added as a monomer is 100%. Also, the separation of a homopolymer is tried by extracting the modified natural rubber a with a petroleum ether and further extracting with a 2:1 mixed solvent of acetone and methanol, but the homopolymer is not detected from the analysis of the extract, so that it is confirmed that 100% of the monomer added is introduced into the natural rubber molecule. Therefore, the grafting amount of the monomer in the modified natural rubber a is 0.5% by mass based on the rubber component in the natural rubber latex.

Production Example 2 of Modified Natural Rubber Latex

A modified natural rubber latex B is obtained in the same manner as in the Production Example 1 except that 1.7 g of 4-vinylpyridine is added as a monomer instead of 3.0 g of N,N-diethylaminoethyl methacrylate. Also, a modified natural rubber b is obtained in the same manner from the modified natural rubber latex B, and as a result of the analysis, it is confirmed that 100% of the monomer added is introduced into the natural rubber molecule. Therefore, the grafting amount of the monomer in the modified natural rubber b is 0.28% by mass based on the rubber component in the natural rubber latex.

Production Example 3 of Modified Natural Rubber Latex

A modified natural rubber latex C is obtained in the same manner as in the Production Example 1 except that 1.7 g of acrylonitrile is added as a monomer instead of 3.0 g of N,N-diethylaminoethyl methacrylate. Also, a modified natural rubber c is obtained in the same manner from the modified natural rubber latex C, and as a result of the analysis, it is confirmed that 100% of the monomer added is introduced into the natural rubber molecule. Therefore, the grafting amount of the monomer in the modified natural rubber c is 0.28% by mass based on a rubber component in the natural rubber latex.

Production Example 4 of Modified Natural Rubber Latex

A modified natural rubber latex D is obtained in the same manner as in the Production Example 1 except that 2.1 g of 2-hydroxyethyl methacrylate is added as a monomer instead of 3.0 g of N,N-diethylaminoethyl methacrylate. Also, a modified natural rubber d is obtained in the same manner from the modified natural rubber latex D, and as a result of the analysis, it is confirmed that 100% of the monomer added is introduced into the natural rubber molecule. Therefore, the grafting amount of the monomer in the modified natural rubber d is 0.35% by mass based on a rubber component in the natural rubber latex.

Production Example 5 of Modified Natural Rubber Latex

A modified natural rubber latex E is obtained in the same manner as in the Production Example 1 except that 1.4 g of methacrylic acid is added as a monomer instead of 3.0 g of N,N-diethylaminoethyl methacrylate. Also, a modified natural rubber e is obtained in the same manner from the modified natural rubber latex E, and as a result of the analysis, it is confirmed that 100% of the monomer added is introduced into the natural rubber molecule. Therefore, the grafting amount of the monomer in the modified natural rubber e is 0.23% by mass based on a rubber component in the natural rubber latex.

Production Example 6 of Modified Natural Rubber Latex

A modified natural rubber latex F is obtained in the same manner as in the Production Example 1 except that 2.3 g of glycidyl methacrylate is added as a monomer instead of 3.0 g of N,N-diethylaminoethyl methacrylate. Also, a modified natural rubber f is obtained in the same manner from the modified natural rubber latex F, and as a result of the analysis, it is confirmed that 100% of the monomer added is introduced into the natural rubber molecule. Therefore, the grafting amount of the monomer in the modified natural rubber f is 0.38% by mass based on a rubber component in the natural rubber latex.

Preparation Example 1 of Slurry Solution

Into a colloid mill having a rotor diameter of 50 mm are charged 1425 g of deionized water and 75 g of carbon black (N110) and stirred at a rotor-stator gap of 1 mm and a revolution speed of 1500 rpm for 10 minutes, and the resulting slurry is further added with 0.05% of an anionic surfactant [Demol N manufactured by Kao Corporation] and circulated three times by using a pressure-type homogenizer under a pressure of 500 kPa to prepare a slurry 1 (carbon black slurry solution). Moreover, as a 24M4DBP absorption of the carbon black used is measured according to ISO 6894, the 24M4DBP absorption before dispersion into water is 98 mL/100 g and the 24M4DBP absorption after dried and recovered from the slurry solution is 96 mL/100 g (a retention: 98.0%). Also, as a particle size distribution of the carbon black in the slurry solution is measured immediately after dispersion by using a laser diffraction type particle size distribution analyzer [MICROTRAC FRA type] and assuming that a refractive index of water is 1.33 and a refractive index of particle is 1.57, the volume mean particle size (mv) is 15.1 μm and the 90% volume particle size (D90) is 19.5 μm.

Preparation Example 2 of Slurry Solution

Into a colloid mill having a rotor diameter of 50 mm are charged 1425 g of deionized water and 75 g of precipitated silica [manufactured by Nippon Silica Industrial Co., Ltd., Nipsil LP] and stirred at a rotor-stator gap of 0.3 mm and a revolution speed of 7000 rpm for 10 minutes to prepare a slurry 2 (silica slurry solution). Moreover, as a 24M4DBP absorption of the silica used is measured according to ISO 6894, the 24M4DBP absorption before dispersion into water is 150 mL/100 g and the 24M4DBP absorption after dried and recovered from the slurry solution is 144 mL/100 g (a retention: 96.0%). Also, as the particle size distribution of the silica in the slurry solution is measured immediately after dispersion by using a laser diffraction type particle size distribution analyzer [MICROTRAC FRA type] and assuming that a refractive index of water is 1.33 and a refractive index of particle is 1.57, the volume mean particle size (mv) is 13.2 μm and the 90% volume particle size (D90) is 24.0 μm.

Preparation Example 3 of Slurry Solution

Into a colloid mill having a rotor diameter of 50 mm are charged 1425 g of deionized water and 75 g of gibbsite-type aluminum hydroxide [manufactured by Showa Denko K.K., Higilite H-43M] and stirred at a rotor-stator gap of 0.5 mm and a revolution speed of 1500 rpm for 10 minutes to prepare a slurry 3 (aluminum hydroxide slurry solution). Moreover, as the 24M4DBP absorption of the aluminum hydroxide used is measured according to ISO 6894, the 24M4DBP absorption before dispersion into water is 52 mL/100 g and the 24M4DBP absorption after dried and recovered from the slurry solution is 52 mL/100 g (a retention: 100.0%). Also, as the particle size distribution of the aluminum hydroxide in the slurry solution is measured in the same manner by assuming that a refractive index of particle is 1.57, the volume mean particle size (mv) is 5.1 μm and the 90% volume particle size (D90) is 8.8 μm.

(Coagulating and Drying Steps)

Into a homomixer are charged the modified natural rubber latex and the slurry solution in a combination shown in Table 1, 2 or 3 and added with carbon black, silica or aluminum hydroxide in an amount of 50 parts by mass based on 100 parts by mass of the rubber component, and coagulated by adding formic acid until pH reaches 4.7 with stirring. The resulting coagulated mass is collected, washed with water, dehydrated until a moisture content reaches about 40% and further dried by using a biaxial milling extruder made by Kobe Steel, Ltd. [corotating screw diameter=30 mm, L/D=35, three vent holes] at a barrel temperature of 120° C. and a revolution speed of 100 rpm to obtain a modified natural rubber masterbatch.

Production Example of Natural Rubber Masterbatch

For the comparison, a natural rubber latex G is prepared only by diluting with water without the above modifying step so as to have the same concentration of the rubber component as in the aforementioned latex. A natural rubber masterbatch is obtained in the same manner as in the Production Example of the modified natural rubber masterbatch by using the natural rubber latex G and the slurry 1, 2 or 3.

Examples 1-3 and Comparative Example 1)

A rubber composition is prepared by compounding and milling 5 parts by mass of aromatic oil, 2 parts by mass of stearic acid, 1 part by mass of an antioxidant 6C [N-(1,3-dimethylbutyl)-N'-phenyl-p-phenylenediamine], 3 parts by mass of zinc white, 0.8 part by mass of a vulcanization accelerator CZ [N-cyclohexyl-2-benzothiazylsulfenamide] and 1 part by mass of sulfur based on 150 parts by mass of the rubber masterbatch made according to the combination in Table 1 in a plastomill.

Comparative Example 2

A rubber composition is prepared by compounding and dry-milling 50 parts by mass of carbon black (N110), 5 parts by mass of aromatic oil, 2 parts by mass of stearic acid, 1 part by mass of the antioxidant 6C, 3 parts by mass of zinc white, 0.8 part by mass of the vulcanization accelerator CZ and 1 part by mass of sulfur based on 100 parts by mass of the modified natural rubber a in a plastomill.

Examples 4-15 and Comparative Examples 3 and 5

A rubber composition is prepared by compounding and milling 4 parts by mass of a silane coupling agent [manufactured by Degussa, Si69], 2 parts by mass of stearic acid, 1 part by mass of an antioxidant 6C, 3 parts by mass of zinc white, 1 part by mass of a vulcanization accelerator NS [N-t-butyl-2-benzothiazolylsulfenamide] and 1.2 parts by mass of sulfur based on 150 parts by mass of the rubber masterbatch made according to the combination in Table 2 or 3 in the plastomill.

Comparative Examples 4 and 6

A rubber composition of Comparative Example 4 is prepared by compounding and dry-milling 50 parts by mass of silica [manufactured by Nippon Silica Industrial Co., Ltd., Nipsil LP], 4 parts by mass of the silane coupling agent, 2 parts by mass of stearic acid, 1 part by mass of the antioxidant 6C, 3 parts by mass of zinc white, 1 part by mass of the vulcanization accelerator NS and 1.2 parts by mass of sulfur based on 100 parts by mass of the modified natural rubber a in a plastomill. Also, a rubber composition of Comparative Example 6 is obtained in the same manner except that aluminum hydroxide [manufactured by Showa Denko K.K., Higilite H-43M] is used instead of silica.

<Evaluation of Properties of Rubber Composition>

With respect to the resulting rubber compositions, the Mooney viscosity, tensile strength (Tb), tan δ and wear resistance are measured and evaluated by the following methods. The results are shown in Tables 1-3.

(1) Mooney Viscosity

The Mooney viscosity $ML_{1+4}$(130° C.) of the rubber composition is measured at 130° C. according to JIS K6300-1994.

(2) Tensile Strength

With respect to a vulcanized rubber obtained by vulcanizing the rubber composition at 145° C. for 33 minutes, the tensile test is conducted according to JIS K 6301-1995 to measure a tensile strength (Tb). The larger the tensile strength, the better the fracture resistance.

(3) Tan δ

With respect to a vulcanized rubber obtained by vulcanizing the rubber composition at 145° C. for 33 minutes, a loss tangent (tan δ) is measured at a temperature of 50° C., a strain of 5% and a frequency of 15 Hz by using a viscoelasticity measuring device [manufactured by RHEOMETRICS Corporation]. The smaller the tan δ, the better the low loss factor.

(4) Wear Resistance

The wear resistance is evaluated by measuring a worn amount of a vulcanized rubber obtained by vulcanizing the rubber composition at 145° C. for 33 minutes at a slip ratio of 60% and room temperature by means of a Lambourn abrasion tester, which is shown by an index on the basis that an inverse number of the worn amount of Comparative Example 1 is 100 in Table 1, an inverse number of the worn amount of Comparative Example 3 is 100 in Table 2 and an inverse number of the worn amount of Comparative Example 5 is 100 in Table 3, respectively. The larger the index value, the less the worn amount and the better the wear resistance.

TABLE 1

|  | Example 1 | Example 2 | Example 3 | Comparative Example 1 | Comparative Example 2 |
| --- | --- | --- | --- | --- | --- |
| Method of mixing carbon black | Masterbatch | Masterbatch | Masterbatch | Masterbatch | Dry milling |
| (Modified) natural rubber latex | A | B | C | G | — |
| Slurry | Slurry 1 | Slurry 1 | Slurry 1 | Slurry 1 | — |
| Modified natural rubber | — | — | — | — | a |
| Mooney viscosity $ML_{1+4}$(130° C.) | 76 | 73 | 74 | 75 | 87 |
| Tb (MPa) | 29.2 | 29.3 | 29.0 | 27.5 | 27.9 |
| tan δ | 0.125 | 0.121 | 0.128 | 0.153 | 0.144 |
| Wear resistance (index) | 125 | 126 | 122 | 100 | 108 |

TABLE 2

|  | Example 4 | Example 5 | Example 6 | Example 7 | Example 8 | Example 9 | Comparative Example 3 | Comparative Example 4 |
| --- | --- | --- | --- | --- | --- | --- | --- | --- |
| Method of mixing silica | Masterbatch | Masterbatch | Masterbatch | Masterbatch | Masterbatch | Masterbatch | Masterbatch | Dry milling |
| (Modified) natural rubber latex | A | D | B | E | C | F | G | — |
| Slurry | Slurry 2 | Slurry 2 | Slurry 2 | Slurry 2 | Slurry 2 | Slurry 2 | Slurry 2 | — |
| Modified natural rubber | — | — | — | — | — | — | — | a |
| Mooney viscosity $ML_{1+4}$(130° C.) | 84 | 84 | 80 | 81 | 81 | 83 | 82 | 93 |
| Tb (MPa) | 28.1 | 28.0 | 27.9 | 28.0 | 28.2 | 28.3 | 26.2 | 26.9 |
| tan δ | 0.112 | 0.114 | 0.109 | 0.115 | 0.116 | 0.113 | 0.146 | 0.135 |
| Wear resistance (index) | 127 | 123 | 128 | 122 | 125 | 123 | 100 | 109 |

TABLE 3

| | Example 10 | Example 11 | Example 12 | Example 13 | Example 14 | Example 15 | Comparative Example 5 | Comparative Example 6 |
|---|---|---|---|---|---|---|---|---|
| Method of mixing aluminum hydroxide | Masterbatch | Masterbatch | Masterbatch | Masterbatch | Masterbatch | Masterbatch | Masterbatch | Dry milling |
| (Modified) natural rubber latex | A | D | B | E | C | F | G | — |
| Slurry | Slurry 3 | Slurry 3 | Slurry 3 | Slurry 3 | Slurry 3 | Slurry 3 | Slurry 3 | — |
| Modified natural rubber | — | — | — | — | — | — | — | a |
| Mooney viscosity $ML_{1+4}(130°C.)$ | 68 | 65 | 64 | 67 | 67 | 69 | 67 | 74 |
| Tb (MPa) | 24.8 | 24.5 | 24.9 | 24.2 | 24.5 | 24.1 | 22.5 | 23.0 |
| tan δ | 0.108 | 0.110 | 0.108 | 0.115 | 0.111 | 0.113 | 0.138 | 0.130 |
| Wear resistance (index) | 124 | 126 | 125 | 124 | 122 | 129 | 100 | 108 |

As seen from the comparison of Examples 1-3 with Comparative Example 1 in Table 1, the comparison of Examples 4-9 with Comparative Example 3 in Table 2 and the comparison of Examples 10-15 with Comparative Example 5 in Table 3, the fracture characteristics, the low loss factor and the wear resistance of the rubber composition can be highly improved by using the modified natural rubber masterbatch instead of the natural rubber masterbatch. Also, as seen from the comparison of Examples 1-3 with Comparative Example 2 in Table 1, the comparison of Examples 4-9 with Comparative Example 4 in Table 2 and the comparison of Examples 10-15 with Comparative Example 6 in Table 3, the processability, the fracture characteristics, the low loss factor and the wear resistance of the rubber composition can be more highly improved when the modified natural rubber masterbatch is used as compared with the case that the modified natural rubber is mixed with the filler by the dry milling.

The invention claimed is:

1. A method for producing a modified natural rubber masterbatch, which comprises the step of mixing a modified natural rubber latex, which is formed by adding a polar group-containing monomer to a natural rubber latex to graft-polymerize the polar group-containing monomer onto a natural rubber molecule in the natural rubber latex, with a slurry solution formed by previously dispersing at least one filler selected from the group consisting of carbon black, silica and an inorganic compound represented by the following general formula (I):

$$nM.xSiO_y.zH_2O \qquad (I)$$

[wherein M is at least one selected from the group consisting of a metal of aluminum, magnesium, titanium, calcium or zirconium, oxides and hydroxides of these metals, their hydrates, and carbonates of these metals, n is an integer of 1-5, x is an integer of 0-10, y is an integer of 2-5, and z is an integer of 0-10] into water, wherein a grafting amount of the polar group-containing monomer is 0.01%-3.0% by mass based on a rubber component in the natural rubber latex.

2. A method for producing a modified natural rubber masterbatch according to claim 1, wherein the filler in the slurry solution has a volume mean particle size (mv) of not more than 25 μm and a 90% volume particle size (D90) of not more than 30 μm, and a 24M4 DBP absorption of the filler dried and recovered from the slurry solution is maintained at 93% or more of the 24M4DBP absorption before being dispersed into the water.

3. A method for producing a modified natural rubber masterbatch according to claim 1, wherein the filler is carbon black, and the polar group of the polar group-containing monomer is at least one selected from the group consisting of amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group and tin-containing group.

4. A method for producing a modified natural rubber masterbatch according to claim 1, wherein the filler is at least one selected from the group consisting of silica and the inorganic compound represented by the general formula (I), and the polar group of the polar group-containing monomer is at least one selected from the group consisting of amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group and alkoxysilyl group.

5. A method for producing a modified natural rubber masterbatch according to claim 1, wherein the modified natural rubber latex and/or the slurry solution further contains a surfactant.

6. A method for producing a modified natural rubber masterbatch according to claim 1, wherein the silica is any one of precipitated silica, fumed silica and colloidal silica.

7. A method for producing a modified natural rubber masterbatch according to claim 1, wherein the inorganic compound represented by the general formula (I) is at least one selected from the group consisting of alumina ($Al_2O_3$), alumina monohydrate ($Al_2O_3.H_2O$), aluminum hydroxide [$Al(OH)_3$], aluminum carbonate [$Al_2(CO_3)_3$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black, calcium oxide (CaO), calcium hydroxide [$Ca(OH)_2$], aluminum magnesium oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicate ($Al_2SiO_5$, $Al_4.3SiO_4.5H_2O$), magnesium silicate ($Mg_2SiO_4$, $MgSiO_3$), calcium silicate ($Ca_2SiO_4$), aluminum calcium silicate ($Al_2O_3.CaO.2SiO_2$), magnesium calcium silicate ($CaMgSiO_4$), calcium carbonate ($CaCO_3$), zirconium oxide ($Zr)_2$), zirconium hydroxide, zirconium carbonate [$Zr(CO_3)_2$] and crystalline aluminosilicate.

8. A method for producing a modified natural rubber masterbatch according to claim 1, wherein M in the general formula (I) is at least one selected from the group consisting of aluminum metal, oxide and hydroxide of aluminum, their hydrates, and carbonate of aluminum.

9. A method for producing a modified natural rubber masterbatch according to claim 1, which further comprises the steps of coagulating the mixture of the modified natural rubber latex and the slurry solution and drying the resulting coagulated mass while applying a mechanical shearing force.

10. A method for producing a modified natural rubber masterbatch according to claim 9, wherein the drying is performed by a continuous milling machine.

11. A method for producing a modified natural rubber masterbatch according to claim 10, wherein the continuous milling machine is a biaxial milling extruder.

12. A modified natural rubber masterbatch produced by a method as claimed in claim 1.

13. A rubber composition comprising a modified natural rubber masterbatch as claimed in claim 12.

14. A tire comprising a rubber composition as claimed in claim 13 in any tire member.

* * * * *